July 11, 1944.   H. R. FISCHER   2,353,451
DIMPLING MACHINE WITH EJECTOR FOR BROKEN PINS
Filed Feb. 5, 1943   2 Sheets-Sheet 1
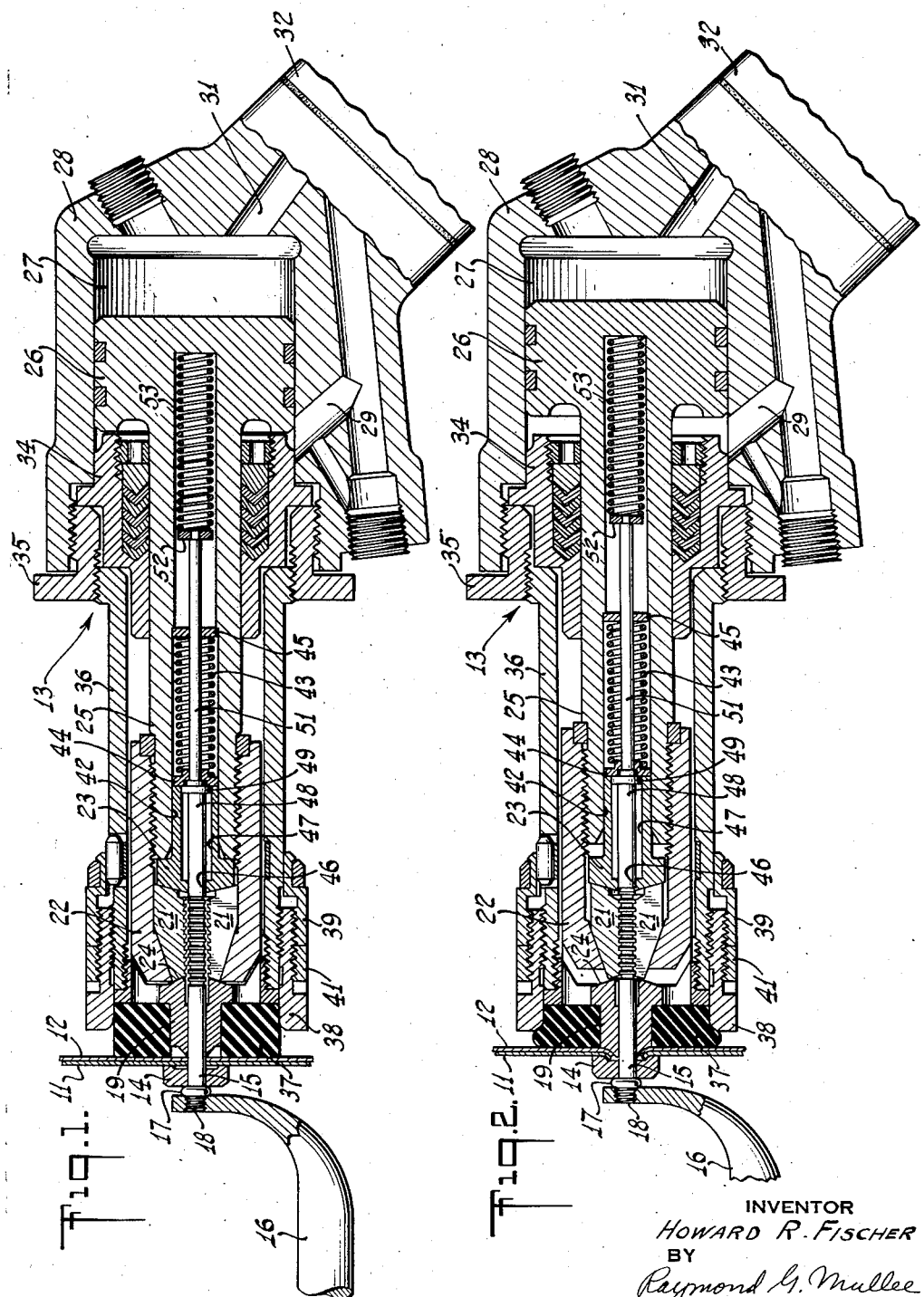
INVENTOR
HOWARD R. FISCHER
BY
Raymond G. Mullee
ATTORNEY July 11, 1944. H. R. FISCHER 2,353,451
DIMPLING MACHINE WITH EJECTOR FOR BROKEN PINS
Filed Feb. 5, 1943 2 Sheets-Sheet 2
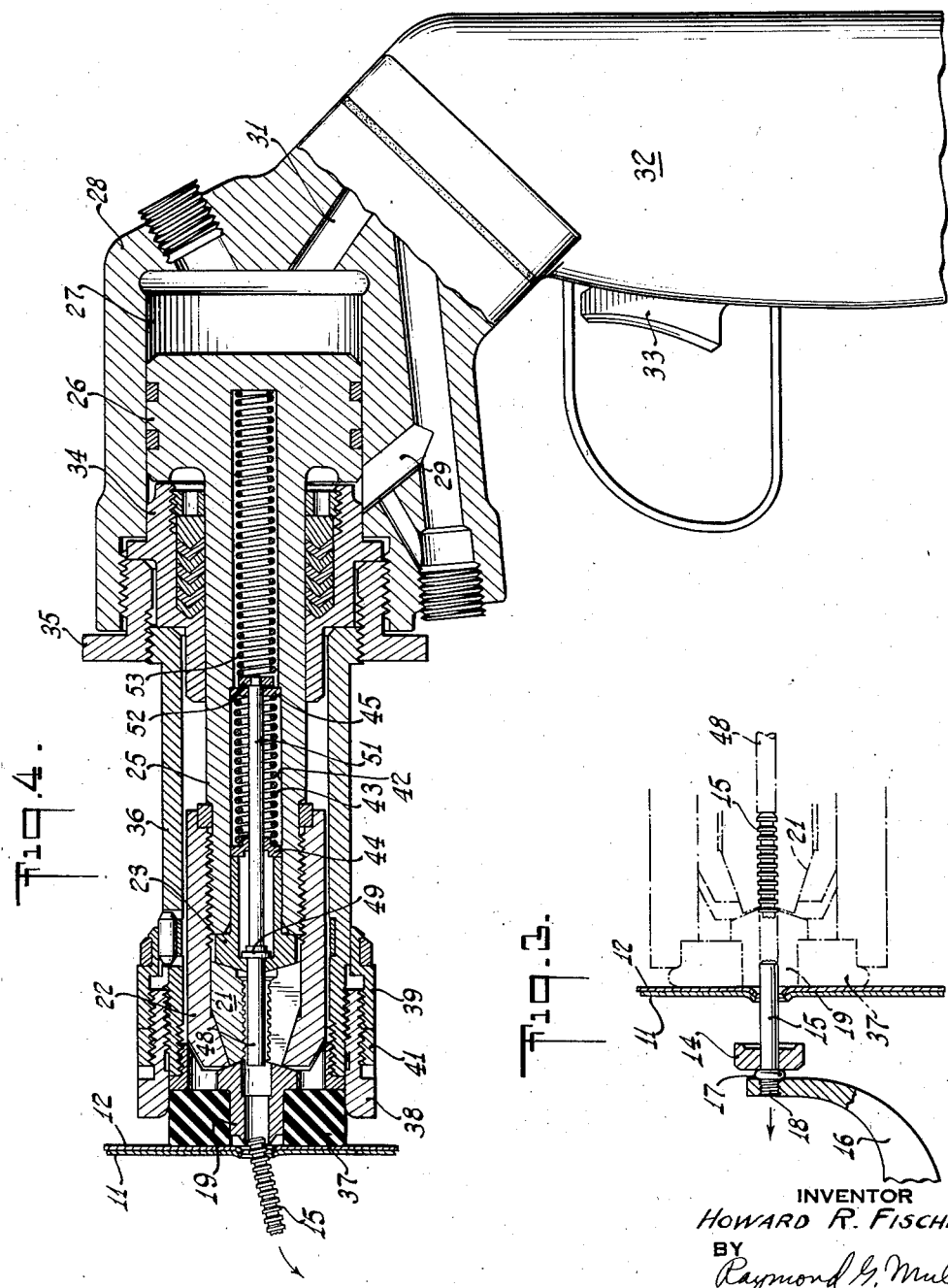
INVENTOR
HOWARD R. FISCHER.
BY
Raymond G. Mullee
ATTORNEY Patented July 11, 1944

2,353,451

UNITED STATES PATENT OFFICE 2,353,451

DIMPLING MACHINE WITH EJECTOR FOR BROKEN PINS

Howard R. Fischer, Detroit, Mich., assignor to Chicago Pneumatic Tool Company, New York, N. Y., a corporation of New Jersey Application February 5, 1943, Serial No. 474,792

4 Claims. (Cl. 153—21)

This invention relates to dimpling apparatus and more particularly to means in such apparatus for ejecting a fragment of a dimpling mandrel or pin which has broken under the stress of operation.

The present invention is an improvement upon the machine of application Serial No. 471,950, filed January 11, 1943, by H. R. Fischer. In that application there is disclosed a portable power tool or gun adapted for the work of dimpling overlapping metal sheets, like those comprising the skin covering of airplanes, in order that the heads of rivets subsequently set in the dimpled positions may lie flush with the sheet surface. The dimpling gun operates from one side of the airplane structure and works through first and second complementary dies which contact the overlapping sheets on opposite sides thereof and are respectively removable from and integral with the tool. The first or removable die has a shank adapted to be passed through the work and through the second or integral die into the gun where it is gripped by chuck mechanism and pulled, the reaction being applied to the second die. The pair of dies are thereby squeezed together and the intermediate work sheets are pressed inward in the form of a dimple. Following the formation of one dimple the removable die is released by the chuck mechanism, withdrawn by hand from the gun and inserted in a guide hole defining the next dimpling position, the shank being gripped and pulled as before by the gun. This operation is repeated as a series of dimples are fashioned in quick succession and it is not an uncommon occurrence for the shank of the removable die to break as a result of the strains placed upon it. After the fracture, that portion of the shank gripped by the chuck mechanism remains in the tool, and, being inaccessible to the hand, is not easily removed. In most cases a partial disassembly of the tool is required before the broken fragment can be taken from the chuck. The necessity for disassembling and reassembling the dimpling gun each time a die shank is broken in use lessens the utility of the tool since the rate of production is slowed.

An object of the present invention is to increase the utility of dimpling tools, particularly as applied to the aircraft industry, by providing them with automatic means for ejecting a die fragment contained in the tool as a result of breakage.

Another object is to apply to the removable die a constant pressure tending to force it out of the gun in order that it may be easily removed following the dimpling operation and in order that any broken fragment thereof will be ejected.

In carrying out these objects a dimpling tool of the type shown in the prior application Serial No. 471,950 is provided with a spring pressed plunger extending between the jaws of the chuck mechanism and displaced therefrom by the entrance of the shank of the removable die, the plunger acting in turn to displace the shank when the removable die has been released by the chuck.

Other objects and structural details of the invention will be apparent from the following description when read in conjunction with the accompanying drawings, wherein:

Fig. 1 is a fragmentary view in longitudinal section showing a dimpling tool embodying the present invention, the parts being shown after the insertion of the shank of the removable die into the chuck but before the start of the gripping and pulling operation;

Fig. 2 is a view similar to Fig. 1, showing the parts after formation of a dimple, and before release of the removable die;

Fig. 3 is a detail view of the removable die as it appears immediately following fracture of the shank thereof while dimpling, the front end of the gun being shown in phantom outline and indicating that a fragment of the shank remains clamped within the chuck; and Fig. 4 is a view like Figs. 1 and 2, showing the gun in the act of ejecting a fragment of a broken die shank following release of said fragment by the chuck.

Referring to the drawings, the work is represented by a pair of metal sheets 11 and 12 in surface engagement. Positioned on one side of the laminated structure, and adapted to be held by one operator, is a power tool 13 while on the other side of the structure, and adapted to be held by another operator, is a die assembly comprising a recessed die 14, a die shank or mandrel 15 and a holder 16. The die 14 is slidably mounted on the shank 15 and occupies a position limiting against an annular collar 17 near one end of the shank. Beyond the collar 17 the die shank is constructed as a threaded extension 18 providing a detachable connection with the holder 16. The opposite end of the shank 15, and a portion of its length inward thereof, is cut by annular grooves in order that it may be securely gripped. At the front of the gun 13 is a die 19 formed with a convex nose complementary to the recess in die 14. When dimpling, the dies 14 and 19 are brought into engagement with opposite work surfaces at positions surrounding a drilled guide hole. The shank 15 passes through the guide hole and through a longitudinal opening in the die 19 into a chuck mechanism comprised of jaws 21 and cam sleeve 22. The jaws 21 are maintained normally open in position to receive the die shank 15 by the pressure of a plunger 23 urging the jaws into contact with a frusto-conical or cam surface 24 on the rear surface of the die 19. The cam sleeve 22 is secured to an elongated rod 25 integral with a fluid pressure operated piston 26. Movement of the piston 26 rearward, or in a right hand direction as viewed in the drawings, serves to draw the cam sleeve 22 also rearward, an action causing the jaws 21 to close upon the die shank 15. The inner surfaces of the jaws 21 are grooved in an arrangement complementary to the grooving of shank 15 so that the shank is locked within the chuck and is pulled as pressure of the piston 26 continues to be applied.

The piston 26 moves within a chamber 27 in a cylinder 28. Pressure fluid is supplied to the chamber 27 by passages 29 and 31 leading from a handle 32 (see Fig. 4), the supply of fluid being under the control of a trigger 33. A bushing 34 closes the front end of cylinder 28, being held therein by an adapter 35. Extending forwardly from the adapter 35 is a cylinder extension 36 surrounding piston rod 25 and the chuck mechanism associated therewith. The integral die 19 is secured to the front end of cylinder extension 36. To move the piston 26 rearward and effect gripping and pulling motions of the chuck jaws upon die shank 15 pressure fluid is admitted to the front of the piston by way of passage 29 while the area rearward of the piston is connected to exhaust through passage 31. In urging the piston 26 rearward the fluid reacts on bushing 34 and the relatively stationary parts of the cylinder assembly to exert simultaneously a forward pressure on the die 19. The parts are illustrated in Fig. 2 under this condition of operation, that is, in the process of squeezing the work between the dimpling dies. It is seen that the opposing pressures cause the work sheets, which are unsupported inside the annular rim of die 14, to yield and take the shape of a dimple at the point of engagement by the dies.

As a means for preventing distortion of the metal outside the area of the dimple the die 19 is surrounded by a rubber pad 37. The pad 37 engages the work in accompaniment with the die 19 and is subjected to the same reactionary pressure. Preferably the pressure of the pad 37 is varied to suit the thickness of the work sheets, the pad being made most resistant when working on thick heavy sheets and its resistance reduced when lighter sheets are encountered. The pad is confined in a retainer 38 and pressure regulation is accomplished by causing the retainer to enclose more or less of the pad. The retainer 38 is screw threaded onto the cylinder extension 36 and may be turned relatively thereto by an adjustment collar 39, a locking ring 41 being provided in order that the relation between retainer 38 and collar 39 may be changed at will.

The stresses to which the die shank or mandrel is subjected are such that the shank is likely to break after repeated operations. The fracture occurs normally during the application of pressure and usually at the weakest point along the shank which is where the cylindrical portion meets the grooved portion. At the time the die shank breaks the grooved end is clamped between the chuck jaws 21 and this part remains in the gun as a fragment (see Fig. 3). The remainder or free end of the shank is projected out of the gun and away from the work by the sudden release of the forces which just previously had been pulling it with a powerful pressure in the opposite direction. Such expulsion is therefore an action of considerable force and would be a potential source of injury to the operator were it not for the provision of the holder 16. The grooved shank end remaining in the gun cannot be withdrawn until the cycle of operation is completed by the return of the piston 26 and the consequent opening of the jaws 21. Difficulty has been experienced, however, in removing the shank end due to the fact that in the use of the die shank the diameter of the grooved portion is slightly increased by burrs or fins raised on the pressure side of the rings defined by the grooves. The friction created by the burrs, although slight, is sufficient to prevent the small fragment from dropping out of the chuck by the force of gravity alone.

The problem of getting the broken shank fragment out of the tool, without the necessity of disassembling the front end thereof, has given rise to the present invention. According to the newly conceived manner of operation the shank end is ejected from the chuck and out through the die 19 automatically at the end of a cycle of operation. The plunger 23, it will be observed, is formed with a head portion immediately in advance of the front end of piston rod 25 and with a stem portion extending into a longitudinal bore 42 in the rod. Within the bore 42, rearward of the plunger 23, is a compression spring 43 confined between washers 44 and 45. Washer 44 bears against the rear of plunger 23 and washer 45 is seated on an internal shoulder in the bore. Acting through the washer 44, therefore, the spring 43 exerts a continuous forward pressure on the plunger 23, this pressure serving to prevent the chuck jaws 21 from following the initial rearward movement of the cam sleeve 22 and to open the jaws as the sleeve moves forward during the return stroke. The plunger 23 has a through longitudinal bore 46 and a counterbore 47. Reciprocable within the bore 46 and projecting beyond the front end of the plunger 23 is a second plunger 48. A collar 49 on the plunger 48 fits within the counterbore 47 and is engageable with the front end of the counterbore and with the washer 44 to define the limits of movement of the second plunger. A rearward extension 51 of the plunger 48 passes through the assembly comprising washer 44, spring 43 and washer 45 farther into the bore 42. A collar 52 at the inner end of extension 51 holds a spring 53 compressed in the bottom of the bore 42. Because of the pressure of spring 53 the plunger 48 tends to occupy a forwardly projecting position with respect to the plunger 23. Being in substantial alignment with the opening in die 19, the projecting end of the inner plunger may pass between the chuck jaws 21, and, in entering between said jaws will dislodge any fragmental part loosely held therein.

According to one method of dimpling, in inserting the die shank 15 into the gun the shank first is passed through the work to the full limit of its length and held in that position with a manual pressure. The gun then is advanced upon the shank which is guided through the die 19 and into the chuck, engaging as it does so the plunger 48 and displacing it from between the jaws 21. After this step of the operation the parts appear as they are illustrated in Fig. 1, the removable die assembly continuing to be held by hand against the pressure of spring 53. Upon manipulation of the trigger 33 to initiate a cycle of tool operation fluid pressure is applied to the front of piston 26. The piston, together with the cam sleeve 22, moves a short distance rearward relative to the plunger 23 and jaws 21 whereupon the jaws are clamped on the die shank 15. The continuing pressure exerted by the piston 26 serves to pull the die shank and dimple the work as previously described. At the end of this the power stroke the pressure in front of piston 26 is released and a return pressure is applied to the rear face thereof. The piston is by this means restored to normal and the chuck jaws 21 opened, freeing the removable die assembly. Die shank 15 may then be withdrawn from the gun and from the work, such withdrawal being aided by plunger 48. If, in the course of the dimpling operation, the die shank should break the fragment held in the chuck comes automatically under the control of the plunger 48 at the end of the return stroke and is ejected thereby in the manner indicated in Fig. 4.

What is claimed is:

1. In dimpling apparatus including a power tool, the combination of a casing having a die rigidly mounted at the front end thereof adapted to be pressed into contact with one side of the work, a removable die adapted to complement the rigidly mounted die and engage the opposite side of the work, the latter die having a mandrel associated therewith which is adapted to be passed through the work and through said rigidly mounted die into the tool, and cyclical power operated means within said tool for gripping said mandrel and pulling the same while applying the reactive force to said rigidly mounted die, said means comprising radially separable chuck jaws, a power driven piston having means for bringing the jaws together upon said mandrel during rearward travel of the piston, a movable plunger effective upon forward movement of the same to separate said jaws when the latter are released in forward position of said piston, and resilient means urging said plunger forward, said mandrel being subject to occasional accidental breakage by application of the reactive force during operation with the result that a fragment of said mandrel tends to remain in the tool; and ejecting means movable with respect to said plunger and located within said tool in a position to be effective at the conclusion of the working cycle to project forward between said jaws and eject the mandrel fragment from the front end of said tool in all positions thereof.

2. In dimpling apparatus including a power tool, the combination of a casing having a die rigidly mounted at the front end thereof adapted to be pressed into contact with one side of the work, a removable die adapted to complement the rigidly mounted die and engage the opposite side of the work, the latter die having a mandrel associated therewith which is adapted to be passed through the work and through said rigidly mounted die into the tool, and cyclical power operated means within said tool for gripping said mandrel and pulling the same while applying the reactive force to said rigidly mounted die, said means comprising radially separable chuck jaws, a power driven piston having means for bringing the jaws together upon said mandrel during rearward travel of the piston, a movable plunger effective upon forward movement of the same to separate said jaws when the latter are released in forward position of said piston, and resilient means urging said plunger forward, said mandrel being subject to occasional accidental breakage by application of the reactive force during operation with the result that a fragment of said mandrel tends to remain in the tool; a second plunger independently movable with respect to the first mentioned plunger and disposed in a position within said tool to be effective at the conclusion of the working cycle to project forward between said jaws and eject the mandrel fragment from the front end of said tool in all positions thereof, and additional resilient means urging said second plunger in a forward direction toward the front end of said tool.

3. In dimpling apparatus including a power tool, the combination of a casing having a die rigidly mounted at the front end thereof adapted to be pressed into contact with one side of the work, a removable die adapted to complement the rigidly mounted die and engage the opposite side of the work, the latter die having a mandrel associated therewith which is adapted to be passed through the work and through said rigidly mounted die into the tool, and cyclical power operated means within said tool for gripping said mandrel and pulling the same while applying the reactive force to said rigidly mounted die, said means comprising radially separable chuck jaws, a power driven piston having a portion for bringing the jaws together upon said mandrel during rearward travel of the piston, a movable plunger within said piston portion effective upon forward movement of the same to bring said jaws against the inner end of the rigidly mounted die and separate the jaws when the latter are released in forward position of said piston, and a spring means urging said plunger forward, said mandrel being subject to occasional accidental breakage by application of the reactive force during operation with the result that a fragment of said mandrel tends to remain in the tool; a second plunger extending substantially longitudinally through the first mentioned plunger and rearwardly through the rear end thereof, said second plunger being independently movable with respect to said first mentioned plunger and disposed in effective position to project forward between said jaws at the conclusion of the working cycle and eject the mandrel fragment from the front end of said tool, and a second spring means spaced rearwardly of the first mentioned spring means and engaging against said second plunger and urging the same forward toward front end of said tool.

4. In a dimpling apparatus including a power tool, the combination of a casing having a die rigidly mounted at the front end thereof adapted to be pressed into contact with one side of the work, a removable die adapted to complement the rigidly mounted die and engage the opposite side of the work, the latter die having a mandrel associated therewith which is adapted to be passed through the work and through said rigidly mounted die into the tool, and cyclical power operated means within said tool for gripping said mandrel and pulling the same while applying the reactive force to said rigidly mounted die, said means comprising radially separable chuck jaws, a power driven piston having a forwardly extending portion capable of bringing the jaws together upon said mandrel during rearward travel of the piston, said chuck jaws being disposed in the forward end of the piston portion, a slidably mounted hollow plunger within said piston portion effective upon forward movement of the same to bring said jaws against the rear end of the rigidly mounted die and separate the jaws when the latter are released in forward position of said piston, and a spring disposed rearwardly of said plunger within said piston and urging the plunger forward toward said jaws, said mandrel being subject to occasional accidental breakage by application of the reactive force during operation with the result that a fragment of said mandrel tends to remain in the tool; a second plunger within said piston portion extending substantially longitudinally through the first mentioned hollow plunger and rearwardly through the spring thereof, said second plunger being independently movable with respect to said first mentioned plunger and disposed in effective position to project forward between said jaws at the conclusion of the working cycle and eject the mandrel fragment from the front end of the tool, and a second spring spaced rearwardly of the first mentioned spring within said piston and engaging against said second plunger and urging the same forward toward said front end of said tool.

HOWARD R. FISCHER.